Patented Apr. 20, 1943

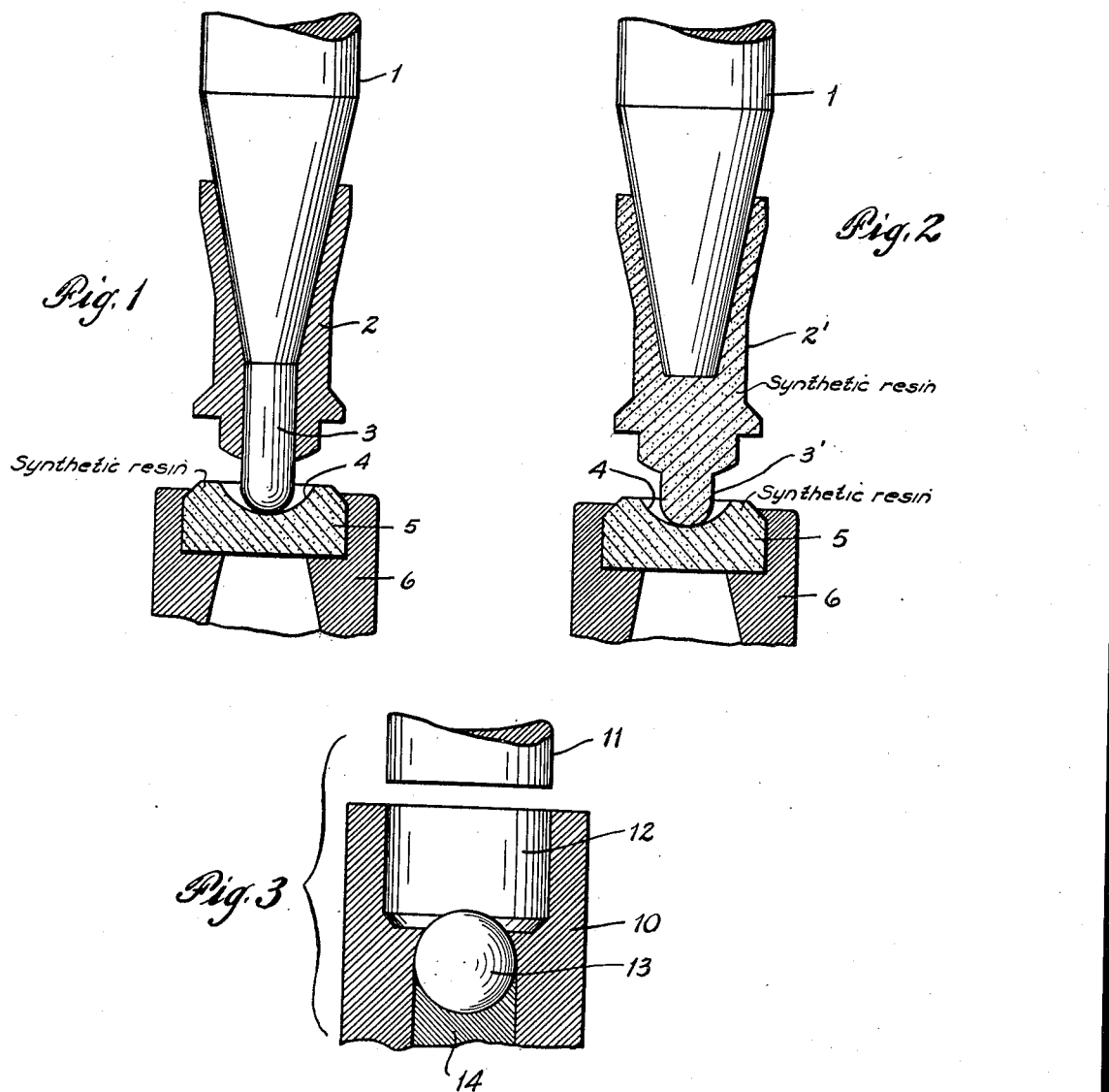

2,316,920

UNITED STATES PATENT OFFICE 2,316,920

ELECTRICITY METER

Ernst Weber, Zug, Switzerland, assignor to Landis & Gyr, A-G., Zug, Switzerland, a corporation of Switzerland Application October 26, 1939, Serial No. 301,351
In Switzerland October 28, 1938

3 Claims. (Cl. 308—159)

The present invention relates to new and useful improvements in measuring instruments and more particularly to the bearings of electricity meters.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates two embodiments of the invention, and together with the description, serves to explain the principles of the invention.

Of the drawing:

Figure 1 is a fragmentary detailed vertical section showing one embodiment of the invention;

Figure 2 is a similar view of a modified form of the invention; and

Figure 3 is a fragmentary vertical section showing a device for producing the bearings according to the present invention.

Measuring instruments such as electricity meters having a rotating shaft must be protected as much as possible against wear and injury such as might be caused by mechanical shock and overloading due to the application of too much electrical power. Otherwise the instruments lose their sensitivity and soon become inactive and are then worthless as measuring instruments. Heretofore, the bearings for such meters have customarily been formed of natural or synthetic precious stones and steel parts, usually the bushing being the jewel and the journal being a steel ball or shaft. Even synthetic jewels are relatively expensive and they are no more satisfactory than the natural jewels as the gradual oxidation or rusting of the shaft or ball creates foreign particles which gather in the bearing so that the bearing is subjected to excessive wear which makes its operation irregular and inactive.

The present invention has for its object the provision of a novel and improved bearing for the rotating parts of electricity meters and other measuring instruments, which bearings are inexpensive and of relatively great durability. The invention also provides an improved meter bearing in which at least one of the parts which is relatively rotatable is formed of a non-ceramic, insulating, molded material which is free of rubber, such as a synthetic material such as a synthetic or artificial resin.

In accordance with the present invention, the measuring instrument having a rotatable shaft is provided with a lower bearing for its shaft which comprises a molded, hard synthetic material such as "plexigum," which is of the acrylic group of synthetic resins, or "trolit," which is of the benzyl cellulose group of synthetic resins. Preferably both of the bearing surfaces in rotational contact with each other are formed of this material, and the lower surface comprises a member having a spherical concavity in which runs the smaller spherically convex end of the shaft, both curved surfaces being extremely smooth and formed of the synthetic resinous material. The member carried by the shaft is preferably formed as a sleeve-like extension of the shaft which terminates in the spherically convex surface, and is adapted to rest within the larger concavity. These bearings are formed by molding and the concave bearing surface is preferably formed by a highly polished steel ball while the convex member is molded in a mold having a perfectly smooth surface at the bearing end.

Referring now in detail to the illustrative embodiment of the invention as shown by Figure 1 of the accompanying drawing, the lower end of the meter shaft I is conically tapered and fitted to a metal sleeve 2 which is provided with a hollow portion in which is inserted a journal member 3 formed from the synthetic resin and provided with a lower end which is of general spherical shape, this convex end resting on the concave working surface 4 of the lower bushing 5 which is seated in a bearing supporting member 6.

In the embodiment shown in Figure 2 of the drawing, the lower end of the meter shaft I is conically tapered and fits into a sleeve 2' which extends downwardly and is provided with an integral spherically convex journal 3' at its end, and this journal runs on the bearing surface 4 of the synthetic resin bushing 5 as in Figure 1.

Figure 3 of the drawing illustrates a suitable mold for producing the lower bushings 5. As embodied, the mold body 10 is suitably shaped to correspond to the cylindrical and beveled portions of the bearing 5 and a plunger 11 fits into the concavity 12 of the mold. On the under side of the mold a highly polished spherical steel ball 13 projects upwardly into the cavity 12 and is held in this position by means of its support 14. A suitable quantity of the synthetic resin is introduced into the cavity 12 and the plunger 11 is pressed downwardly as heat is applied to the resin so that the resin is formed into the bushing 5.

The invention in its broader aspects is not limited to the specific mechanisms shown and described but departures may be made therefrom within the scope of the accompanying claims without departing from the principles of the invention and without sacrificing its chief advantages.

What I claim is:

1. A step bearing for a precision instrument, such as an electric meter, comprising fixed and rotatable bearing members, said members being provided with concave and convex bearing surfaces in abutting relationship, both of said bearing members being composed of a thermoplastic resin selected from the group consisting of a benzyl cellulose synthetic resin and an acrylic synthetic resin.

2. A step bearing for a precision instrument such as an electric meter comprising fixed and rotatable bearing members, said members being provided with concave and convex bearing surfaces in abutting relationship, at least one of said bearing members being composed of a pure, thermoplastic resin selected from the group consisting of a benzyl cellulose synthetic resin and an acrylic synthetic resin.

3. A step bearing for a precision instrument, composed of a thermoplastic resin selected from the group consisting of a benzyl cellulose synthetic resin and an acrylic synthetic resin.

ERNST WEBER.